(12) United States Patent
Katsube

(10) Patent No.: US 9,228,076 B2
(45) Date of Patent: Jan. 5, 2016

(54) PNEUMATIC TIRE FOR HEAVY LOAD

(75) Inventor: Yoshihiro Katsube, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 291 days.

(21) Appl. No.: 13/320,580

(22) PCT Filed: May 18, 2010

(86) PCT No.: PCT/JP2010/058359
§ 371 (c)(1),
(2), (4) Date: Jan. 17, 2012

(87) PCT Pub. No.: WO2010/134523
PCT Pub. Date: Nov. 25, 2010

(65) Prior Publication Data

US 2012/0103497 A1    May 3, 2012

(30) Foreign Application Priority Data

May 18, 2009  (JP) ................. 2009-119923

(51) Int. Cl.
*B60C 15/06*    (2006.01)
*C08L 7/00*    (2006.01)
(Continued)

(52) U.S. Cl.
CPC ... *C08L 7/00* (2013.01); *B60C 1/00* (2013.01); *C08L 9/00* (2013.01); *B60C 2001/005* (2013.04);
(Continued)

(58) Field of Classification Search
CPC .............. B60C 2001/005; B60C 2200/02; B60C 2200/06; B60C 2200/065; B60C 2015/0614; B60C 1/00; Y10T 152/10828

USPC ................................... 152/543, 547
See application file for complete search history.

(56) References Cited

U.S. PATENT DOCUMENTS 5,476,129 A    12/1995    Shoyama
7,268,187 B2    9/2007    Miyazaki
(Continued)

FOREIGN PATENT DOCUMENTS

CN    1740218 A    3/2006
EP    1630000 A2    3/2006
(Continued)

OTHER PUBLICATIONS

Translation of International Preliminary Report on Patentability (Chapter 1 of the PCT) mailing date Dec. 22, 2011 and Translation of Written Opinion of the International Searching Authority dated Jul. 13, 2010 for International Application No. PCT/JP2010/058359.
(Continued)

*Primary Examiner* — Justin Fischer
*Assistant Examiner* — Philip N Schwartz
(74) *Attorney, Agent, or Firm* — Sughrue Mion, PLLC

(57) ABSTRACT

In a pneumatic tire for heavy load in which a rubber chafer 8 is disposed at least in a part brought into contact with a rim in a bead part 1, the rubber chafer uses a rubber composition which comprises 45 to 55 parts by mass of butadiene base rubbers containing 10 to 30 parts by mass of a syndiotactic 1,2-structure-containing polybutadiene rubber and 45 to 55 parts by mass of a natural rubber as a rubber component and more than 50 parts by mass and less than 60 parts by mass of carbon black having DBP of 85 to 115 ml/100 g and a specific surface area by nitrogen adsorption ($N_2SA$) of 50 to 100 $m^2/g$ based on 100 parts by mass of the rubber component.

3 Claims, 1 Drawing Sheet

(51) Int. Cl.
  C08L 9/00  (2006.01)
  B60C 1/00  (2006.01)
  C08K 3/04  (2006.01)

(52) U.S. Cl.
  CPC ..... *B60C 2015/0614* (2013.04); *B60C 2200/06* (2013.04); *C08K 3/04* (2013.01); *Y10T 152/10828* (2015.01)

(56) References Cited

U.S. PATENT DOCUMENTS

| | | | |
|---|---|---|---|
| 2001/0018944 A1* | 9/2001 | Mizuno | 152/547 |
| 2006/0047056 A1 | 3/2006 | Miyazaki | |
| 2008/0283170 A1* | 11/2008 | Maruoka | 152/539 |
| 2009/0056851 A1* | 3/2009 | Maruoka | 152/543 |

FOREIGN PATENT DOCUMENTS

| | | | | |
|---|---|---|---|---|
| JP | 54-045005 A | | 4/1979 | |
| JP | 07-097481 A | | 4/1995 | |
| JP | 07-172118 A | | 7/1995 | |
| JP | 09-302149 A | | 11/1997 | |
| JP | 2001-226526 A | | 8/2001 | |
| JP | 2001225618 A | * | 8/2001 | ............. B60C 15/06 |
| JP | 2006-063143 A | | 3/2006 | |
| JP | 2008-273247 A | | 11/2008 | |
| JP | 2009-096418 A | | 5/2009 | |

OTHER PUBLICATIONS

Extended European Search Report issued Mar. 11, 2013 in European Patent Application No. 10777756.7 to Bridgestone Corporation.

* cited by examiner

PNEUMATIC TIRE FOR HEAVY LOAD

TECHNICAL FIELD

The present invention relates to a pneumatic tire for heavy load used for trucks, buses, industrial vehicles, construction vehicles, aircrafts and the like.

BACKGROUND ART

A structure of a bead part in pneumatic radial tires for heavy load has so far been studied in various manners in order to satisfy a motion performance and a durability performance required to tires. Further, improvement in a high speed performance of tires has come to be required according to development in highways and speed-up of vehicles, and great force is exerted more and more on a rubber chafer disposed between a rim and a bead so that a rubber chafer provided with further durability is increasingly needed.

Performances required essentially to a rubber chafer include abrasion resistance to a rim, slipping resistance to a rim, an air sealing property, an air barrier property, exhausting resistance, crack resistance and the like, and since required performances residing in an antinomic relation are present among them, a rubber chafer has so far been constituted by selecting one or more kinds of rubber materials which can exert the above respective performances in moderation under mutual compromise.

However, pneumatic tires for heavy load which are provided with the above rubber chafer have involved the problems that they are liable to bring about abrasion to a rim, cracks and the like on a part brought into contact with a rim flange in a period extending from applying no load to applying a 200% load at a relatively early date and in addition thereto, have low weatherability so that they damage a visual quality of the tires and reduce durability thereof.

Then, known as tires which solve the foregoing problems of pneumatic tires for heavy load provided with a rubber chafer are, for example, pneumatic tires wherein the rubber chafer is prepared from a rubber composition in which 0 to 100 parts by weight of carbon black and 20 to 120 parts by weight of silica having a specific surface area by nitrogen adsorption ($N_2SA$) of 4-0210 to 300 $m^2/g$ are compounded based on 100 parts by weight of a diene base rubber and a total amount of carbon black and silica is 50 to 130 parts and in which an organic silane compound is blended in an amount of 5 to 25% by weight based on the weight of silica and wherein increase in an elastic modulus for securing a motion performance is intended to be compatible with fractural resistance of a toe part and abrasion resistance of a rim flange (refer to, for example, patent document 1).

Further, tires in which an elastic modulus of a second stiffener rubber in 100% elongation is increased more than an elastic modulus of a chafer rubber in 100% elongation in order to enhance flexural rigidity of a bead part as much as possible are present among radial tires for aircrafts. In the above case, since the second stiffener rubber is too hard, the second stiffener rubber is likely to blow on a running condition of high heat build-up, and the second stiffener rubber is likely to be peeled off in running for a long time. Known are radial tires for aircrafts in which considering the above problems, the foregoing troubles in the bead part such as abrasion to a rim, blow and peeling are intended to be prevented by using for a side rubber a different kind of rubber from the chafer rubber and reducing an elastic modulus of a second stiffener rubber in 100% elongation less than an elastic modulus of a chafer rubber in 100% elongation (refer to, for example, patent document 2).

However, the pneumatic tires for heavy load described in patent documents 1 and 2 described above have durability and the like which have not so far been observed, but they are not yet satisfactory to performances required in recent years, and the existing situation is that pneumatic tires for heavy load in which a part of a rubber chafer brought into contact with a rim flange, particularly in a period extending from applying no load to applying a 200% load in a state of applying a suited air pressure is improved further in abrasion resistance to a rim, crack resistance and weatherability and which is further excellent in durability are desired to be developed.

PRIOR ART DOCUMENTS

Patent Documents

Patent document 1: Japanese Patent Application Laid-Open Hei 9 No. 302149 (claims, examples and the like)
Patent document 2: Japanese Patent Application Laid-Open Hei 7 No. 172118 (claims, examples and the like)

OUTLINE OF THE INVENTION

Problems to be Solved by the Invention

In light of the problems on the conventional art described above and the existing situation, the present invention intends to solve them, and an object thereof is to provide a pneumatic tire for heavy load in which a rubber chafer, particularly a part thereof brought into contact with a rim flange in a period extending from applying no load to applying a 200% load in a state of applying a suited air pressure is improved in abrasion resistance to a rim, crack resistance and weatherability to a large extent and in which cracks (including cracks starting from a joint part) are further prevented from being generated on a rubber part brought into contact with a rim flange in a period extending from applying no load to applying a load to make it possible to extraordinarily improve durability.

Means for Solving the Problems

Intensive research repeated by the present inventors on the conventional problems described above have resulted in finding that in a pneumatic tire for heavy load in which a rubber chafer is disposed at least in a part brought into contact with a rim in a bead part, a rubber composition containing a specific amount of carbon black having specific physical properties based on 100 parts by mass of a rubber component which is constituted from butadiene base rubbers containing a polybutadiene rubber having specific physical properties and a natural rubber in a range of specific contents is used for the rubber chafer, whereby a pneumatic tire for heavy load which meets the object described above is obtained and that fractural strength of the rubber chafer is controlled to a specific value or higher in any point of a depth direction from an outer surface part to an inner surface part, whereby a pneumatic tire for heavy load which meets the object described above is obtained. Thus, the present invention has come to be completed.

That is, the present invention comprises the following items (1) to (5):
(1) A pneumatic tire for heavy load in which a rubber chafer is disposed at least in a part brought into contact with a rim in a bead part, wherein the rubber chafer uses a rubber composition which comprises 45 to 55 parts by mass of butadiene base rubbers containing 10 to 30 parts by mass of a syndiotactic 1,2-structure-containing polybutadiene rubber and 45 to 55 parts by mass of a natural rubber as a rubber component, and more than 50 parts and less than 60 parts by mass of carbon black having a dibutyl phthalate absorption (DBP) of 85 to 115 ml/100 g and a specific surface area by nitrogen adsorption ($N_2SA$) of 50 to 100 $m^2/g$ based on 100 parts by mass of the rubber component.

(2) The pneumatic tire for heavy load as described in the above item (1), wherein fractural strength of the rubber chafer is 20 MPa or more in any point of a depth direction from an outer surface part to an inner surface part.

(3) The pneumatic tire for heavy load as described in the above item (1) or (2), wherein a modulus M100 of the rubber chafer in 100% elongation is 2.5 to 5.5 MPa.

(4) The pneumatic tire for heavy load as described in any one of the above items (1) to (3), wherein the rubber composition used for the rubber chafer contains 3 to 5 parts by mass of zinc oxide based on 100 parts by mass of the rubber component.

(5) The pneumatic tire for heavy load as described in any one of the above items (1) to (4), wherein the tire is a radial tire for aircrafts.

The "fractural strength" and the "modulus M100 in 100% elongation" each prescribed in the present invention (including examples and others described later) are values measured according to JIS K 6251:2004.

Effects of the Invention

According to the present invention, provided is a pneumatic tire for heavy load in which a rubber chafer, particularly a part thereof brought into contact with a rim flange in a period extending from applying no load to applying a 200% load in a state of applying a suited air pressure is improved in abrasion resistance to a rim, crack resistance and weatherability to a large extent and which further prevents cracks (including cracks starting from a joint part) generated on a rubber part brought into contact with a rim flange in a period extending from applying no load to applying a load to make it possible to extraordinarily improve durability.

MODE FOR CARRYING OUT THE INVENTION

Figure 1:
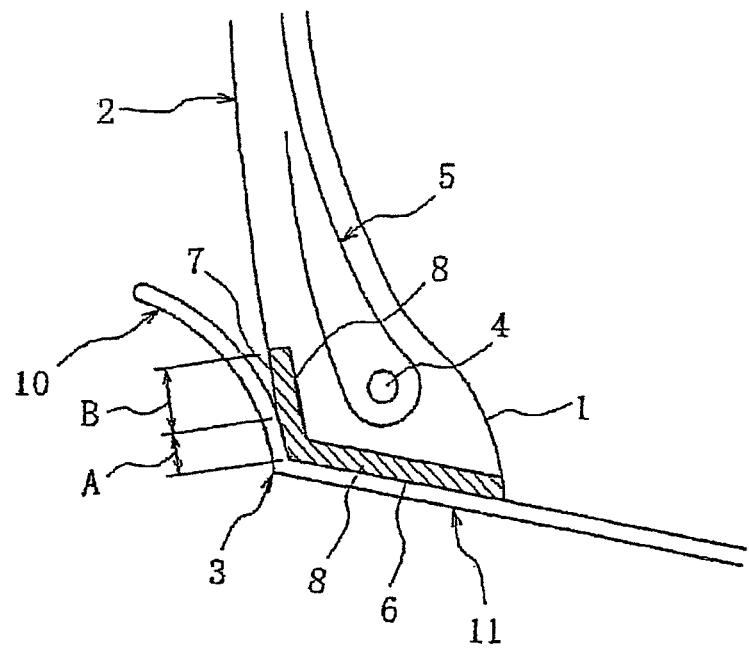
FIG. 1 is a partial cross-sectional drawing of the pneumatic tire for heavy load showing one example of the embodiment in the present invention, and it is a partial cross-sectional drawing of a bead part of the pneumatic tire for heavy load mounted in a regular rim in applying no load in a state in which a regular air pressure is applied.

The embodiment of the present invention shall be explained below in detail.

The pneumatic tire for heavy load according to the present invention is a pneumatic tire for heavy load in which a rubber chafer is disposed at least in a part brought into contact with a rim in a bead part, wherein a rubber component of the rubber chafer uses a rubber composition which comprises 45 to 55 parts by mass of butadiene base rubbers containing 10 to 30 parts by mass of a syndiotactic 1,2-structure-containing polybutadiene rubber and 45 to 55 parts by mass of a natural rubber as a rubber component and more than 50 parts and less than 60 parts by mass of carbon black having a dibutyl phthalate absorption (DBP) of 85 to 115 ml/100 g and a specific surface area by nitrogen adsorption ($N_2SA$) of 50 to 100 $m^2/g$ based on 100 parts by mass of the rubber component.

The rubber component of the rubber chafer in the present invention is constituted from 45 to 55 parts by mass of butadiene base rubbers containing 10 to 30 parts by mass of a syndiotactic 1,2-structure-containing polybutadiene rubber and 45 to 55 parts by mass of a natural rubber from the viewpoints of fractural strength, abrasion resistance and crack resistance.

The butadiene base rubbers used contain 10 to 30 parts by mass of a syndiotactic 1,2-structure-containing polybutadiene rubber from the viewpoints of fractural strength, crack resistance and an adequate modulus value in 100% elongation, and a content of the butadiene base rubbers is 45 to 55 parts by mass in the rubber component.

The syndiotactic 1,2-structure-containing polybutadiene rubber which can be used shall not specifically be restricted as long as it is a polybutadiene rubber having a syndiotactic 1,2-structure, and commercially available products can be used. A butadiene base rubber which can be used in addition to the above products includes, for example, polybutadiene rubbers and high cis polybutadiene rubbers.

The natural rubber which can be used includes natural rubbers used for pneumatic tires for heavy load, and for example, RSS #1 to #5 can be used.

If a content of the syndiotactic 1,2-structure-containing polybutadiene rubber used is less than 10 parts by mass, the fractural strength and the modulus in 100% elongation are reduced. On the other hand, if it exceeds 30 parts by mass, the modulus in 100% elongation is enhanced, but the workability is reduced, so that both are not preferred.

Also, if a content of the butadiene base rubbers is less than 45 parts by mass, the abrasion resistance is reduced, and on the other hand, if it exceeds 55 parts by mass, the fractural strength is reduced, so that both are not preferred.

Further, if a content of the natural rubber is less than 45 parts by mass, the fractural strength is reduced, and on the other hand, if it exceeds 55 parts by mass, the abrasion resistance is reduced, so that both are not preferred.

Carbon blacks having a dibutyl phthalate absorption (DBP) of 85 to 115 ml/100 g and a specific surface area by nitrogen adsorption ($N_2SA$) of 50 to 100 $m^2/g$ are used as the carbon black used for the rubber composition for the rubber chafer of the present invention from the viewpoints of the abrasion resistance and the crack resistance.

"The dibutyl phthalate absorption (DBP)" and "the specific surface area by nitrogen adsorption ($N_2SA$)" which are prescribed in the present invention are regulated in ASTM D 1765-01.

The carbon black which can specifically be used shall not particularly be restricted as long as it is carbon black satisfying the respective ranges of DBP and $N_2SA$ described above, and for example, at least one of N330, N335 and the like can be used.

Carbon blacks having a dibutyl phthalate absorption (DBP) of less than 85 ml/100 g reduce the abrasion resistance, and on the other hand, carbon blacks having a DBP of exceeding 115 ml/100 g deteriorate the processability, the elongation characteristic and the low heat build-up, so that both are not preferred.

Also, carbon blacks having a specific surface area by nitrogen adsorption ($N_2SA$) of less than 50 $m^2/g$ reduce the abrasion resistance, and on the other hand, carbon blacks having a $N_2SA$ of exceeding 100 $m^2/g$ reduce dispersibility thereof and lower the abrasion resistance, so that both are not preferred.

In the present invention, a content of the carbon black having the characteristics described above is more than 50 parts and less than 60 parts by mass, preferably 52 parts by mass or more and 58 parts by mass or less (52 to 58 parts by mass) based on 100 parts by mass of the rubber component.

If a content of the above carbon black is 50 parts by mass or less, the abrasion resistance is reduced, and on the other hand, if it is 60 parts by mass or more, the low heat build-up is deteriorated, so that both are not preferred.

Further, 3 to 5 parts by mass of zinc oxide (zinc white) based on 100 parts by mass of the rubber component is preferably contained in the rubber composition for the rubber chafer of the present invention from the viewpoints of the fractural strength, the crack resistance and the modulus in 100% elongation.

If a content of the zinc oxide is less than 3 parts by mass, the crack resistance and the fractural strength are reduced, and on the other hand, if it exceeds 5 parts by mass, the modulus in 100% elongation does not come to a proper value.

Compounding ingredients for rubber which are usually used in the rubber industry, for example, reinforcing fillers other than carbon black, stearic acid, process oils, antioxidants and the like as well as sulfur and vulcanization accelerators in addition to the rubber component and carbon black having the characteristics described above and zinc oxide can suitably be compounded in the rubber composition for the rubber chafer of the present invention as long as the effects of the present invention are not damaged.

In the pneumatic tire for heavy load in which a rubber chafer is disposed at least in a part brought into contact with a rim in a bead part, fractural strength of the rubber chafer is preferably 20 MPa or more, more preferably 20 to 30 Mpa in any point of a depth direction from an outer surface part to an inner surface part.

The effects which are the object of the present invention can be further exerted by setting fractural strength of the rubber chafer to 20 MPa or more in any point of a depth direction from an outer surface part to an inner surface part.

Setting of fractural strength of the rubber chafer to 20 MPa or more in any point of a depth direction from an outer surface part to an inner surface part can be achieved by suitably combining the respective contents of the rubber component having the characteristics described above, the carbon black having the characteristics described above and zinc oxide and in addition thereto, using the optimum vulcanizing conditions in combination.

If the fractural strength described above is less than 20 MPa, crack resistance of the rubber chafer is reduced.

Further, in the pneumatic tire for heavy load in which a rubber chafer is disposed at least in a part brought into contact with a rim in a bead part, a modulus M100 of the rubber chafer in 100% elongation falls preferably in a range of 2.5 to 5.5 MPa.

If above M100 is less than 2.5 MPa, abrasion resistance of the rubber chafer is reduced in a certain case, and on the other hand, if M100 exceeds 5.5 MPa, crack resistance thereof is reduced.

Setting of a modulus M100 of the rubber chafer in 100% elongation to a range of 2.5 to 5.5 MPa can be achieved, as is the case with what has been described above, by suitably combining the respective contents of the rubber component having the characteristics described above, the carbon black having the characteristics described above and zinc oxide.

The pneumatic tire for heavy load according to the present invention can be prepared according to an ordinary method by disposing the rubber chafer constituted from the rubber composition having the constitution described above at least on a part brought into contact with the rim in the bead part and the other tire members.

Figure 2:
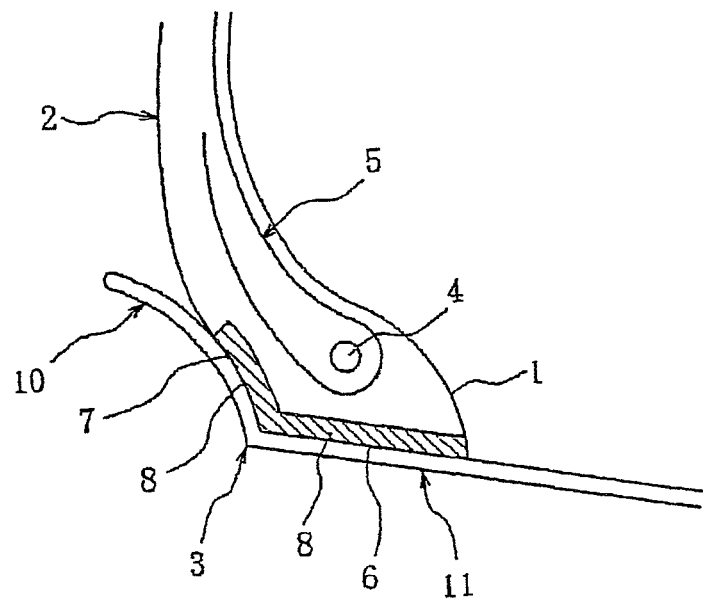
FIG. 2 is a partial cross-sectional drawing of the pneumatic tire for heavy load showing one example of the embodiment in the present invention, and it is a partial cross-sectional drawing of a bead part of the pneumatic tire for heavy load mounted in a regular rim in applying a load (200% load) in a state in which a regular air pressure is applied.

FIG. 1 and FIG. 2 are the partial cross-sectional drawings of the pneumatic tire for heavy load showing one example of the embodiment in the present invention, wherein FIG. 1 is a partial cross-sectional drawing of a bead part in the pneumatic tire for heavy load mounted in a regular rim in applying no load in a state in which a regular air pressure is applied, and FIG. 2 is a partial cross-sectional drawing of a bead part in the pneumatic tire for heavy load mounted in a regular rim in applying a load (200% load) in a state in which a regular air pressure is applied.

The radial tire for heavy load having the above form is provided, as shown in FIG. 1, with a bead part 1 which is engaged with the inner ends of the respective side wall parts 2 extending from both ends of a tread part (not illustrated) toward an inner side in the radial direction of tire and which is set on a regular rim 3 and a carcass 5 which is disposed around a bead core 4 buried in the bead part 1 folding back from the inside of the tire to the outside thereof, and it is provided with the rubber chafer 8 of the present invention at least in a part which is brought into contact with the regular rim 3 (bead base part 6, a part A which is brought into contact with a rim flange 10 in a bead back face part even in applying no load and a part B which is brought into contact with the rim flange 10 in a period extending from applying no load to applying a 200% load of a regular load (FIG. 2)) in a state in which the tire is mounted in the regular rim 3 by the bead part 1 and is applied a regular air pressure.

The rubber chafer 8 which is the principal constitution of the present invention is suitably disposed at least in a part brought into contact with the rim flange 10 and a rim base 11 (the bead base part 6 and a part in which the bead back face part 7 are brought into contact with the rim flange), and a form thereof shall not specifically be restricted. Further, the bead core 4 and the carcass 5 are shown in FIG. 1 and FIG. 2, and the constitutions thereof shall not specifically be restricted and can suitably be selected. Also, the ranges of the part A in the bead back face part which is brought into contact with the rim flange even in applying no load and the part B in the bead back face part which is brought into contact with the rim flange in a period extending from applying no load to applying a 200% load of a regular load are one example of the present invention. The above ranges may be changed according to the form of the tire and the like, and the changes fall in the range of the present invention.

The pneumatic tire for heavy load according to the present invention is used for trucks, buses, industrial vehicles, construction vehicles, aircrafts and the like, and it can suitably be used particularly as a pneumatic radial tire for aircrafts.

In the pneumatic tire for heavy load according to the present invention which is constituted as described above and in which the rubber chafer is disposed at least in a part brought into contact with the rim in the bead part, the rubber component of the rubber chafer comprises 45 to 55 parts by mass of butadiene base rubbers containing 10 to 30 parts by mass of a syndiotactic 1,2-structure-containing polybutadiene rubber and 45 to 55 parts by mass of a natural rubber, and the rubber composition containing the rubber component and 50 to 60 parts by mass of carbon black having a dibutyl phthalate absorption (DBP) of 85 to 115 ml/100 g and a specific surface area by nitrogen adsorption ($N_2SA$) of 50 to 100 $m^2/g$ based on 100 parts by mass of the above rubber component is used for the rubber chafer, and preferably, fractural strength thereof is controlled to 20 MPa or more in any point of a depth direction from an outer surface part to an inner surface part, whereby obtained is the pneumatic tire for heavy load in which the rubber chafer, particularly a part thereof brought into contact with a rim flange is improved in abrasion resistance to a rim, a crack resistance and weatherability to a large extent in a period extending from applying no load to applying a 200% load in a state of applying a suited air pressure and in which cracks (including cracks starting from a joint part) are further prevented from being generated on a rubber part brought into contact with a rim flange in a period extending from applying no load to applying a load to make it possible to extraordinarily improve durability.

Particularly, in a pneumatic tire for high speed and heavy load such as a radial tire for aircrafts in which a pressure of 2.5 MPa or more is applied on a part brought into contact with a rim flange in a period extending from applying no load to applying a 200% load, it is a particularly useful pneumatic tire for heavy load.

EXAMPLES

Next, the present invention shall be explained in further details with reference to examples and comparative examples, but the present invention shall not be restricted to the following examples.

Examples 1 to 8 and Comparative Examples 1 to 8

Rubber compositions used for a rubber chafer according to recipes shown in the following Table 1 and Table 2 were prepared.

The respective rubber compositions obtained were used to measure fractural strength and a modulus M100 in 100% elongation by the following respective methods.

Further, the rubber compositions obtained were disposed on a part (rubber chafer 8) extending from a contact part between the tire and the rim to a part brought into contact with a rim flange in a period extending from applying no load to applying a 200% load in a state in which an appropriate air pressure was applied to prepare a radial tire for aircrafts (size: 50×20.0 R22/32PR). The radial tires for aircrafts were endowed with the same structure as those of conventional radial tires for aircrafts excluding that of the rubber chafer described above. The above radial tires for aircrafts were mounted in regular rims and then subjected to a "rim back face durability test" by the following method.

Measuring Methods of Fractural Strength and Modulus M100 in 100% Elongation:

A sheet of gauge 2 mm was vulcanized at 145° C. for 30 minutes and punched in the form of a JIS No. 3 dumbbell to prepare a sample, and the sample was subjected to a tensile test at room temperature according to JIS K 6251:2004 to measure a value of fractural strength and a modulus in 100% elongation and show them by indices, wherein the values obtained in Comparative Example 1 were set to 100. The fractural strength in Comparative Example 1 was 16.7 MPa, and M100 was 2.5 MPa. It is shown that the larger the value of the index is, the higher and better the fractural strength and the modulus are.

Rim Back Face Durability Test:

The tire was allowed to run at a speed of 64.5 km/hour under a 120% load of a regular load in a drum test to measure time passing until a rubber chafer brought into contact with the rim came to be broken. For the test results, a total of running time on the drum was shown by an index, wherein the test result in Comparative Example 1 was set to 100. The larger the value is, the better the abrasion resistance to a rim and the crack resistance are.

TABLE 1

|  |  | Example | | | | | | | |
|---|---|---|---|---|---|---|---|---|---|
|  |  | 1 | 2 | 3 | 4 | 5 | 6 | 7 | 8 |
| Blend composition (part by mass) | Natural rubber | 50 | 50 | 45 | 55 | 50 | 50 | 50 | 50 |
|  | Polybutadiene rubber 1*1 | 40 | 20 | 35 | 25 | 30 | 30 | 30 | 40 |
|  | Polybutadiene rubber 2*2 | 10 | 30 | 20 | 20 | 20 | 20 | 20 | 10 |
|  | Carbon black*3 | N330 | N330 | N330 | N330 | N330 | N330 | N335 | N335 |
|  |  | 55 | 55 | 55 | 55 | 52 | 58 | 55 | 52 |
|  | Vulcanization accelerator*4 | 2 | 2 | 2 | 2 | 2 | 2 | 2 | 2 |
|  | Sulfur | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 |
|  | Zinc oxide (zinc white) | 3.5 | 3.5 | 3.5 | 3.5 | 3.5 | 3.5 | 3.5 | 3.5 |
|  | Antioxidant*5 | 3 | 3 | 3 | 3 | 3 | 3 | 3 | 3 |
| Rubber property | Fractural strength | 123 | 126 | 123 | 132 | 129 | 141 | 135 | 120 |
|  | M100 | 120 | 136 | 132 | 140 | 120 | 152 | 138 | 115 |
| Tire performance | Tire durability | 400 | 400 | 200 | 400 | 400 | 200 | 300 | 450 |

*1: BR01 manufactured by JSR corporation
*2: syndiotactic 1,2-structure-containing polybutadiene rubber (UBEPOL-VCR412, manufactured by Ube Industries, Ltd.)
*3: N330 (DBP: 102 ml/100 g, $N_2SA$: 78 $m^2/g$)
*3: N335 (DBP: 110 ml/100 g, $N_2SA$: 85 $m^2/g$)
*4: Nocceler NS, manufactured by Ouchi Shinko Chemical Industrial Co., Ltd.
*5: N-(1,3-dimethylbutyl)-N'-phenyl-p-phenylenediamine

TABLE 2

|  |  | Comparative Example | | | | | | | |
|---|---|---|---|---|---|---|---|---|---|
|  |  | 1 | 2 | 3 | 4 | 5 | 6 | 7 | 8 |
| Blend composition (part by mass) | Natural rubber | 60 | 40 | 50 | 50 | 50 | 60 | 50 | 40 |
|  | Polybutadiene rubber 1*1 | 20 | 60 | 30 | 10 | 30 | 20 | 50 | 20 |
|  | Polybutadiene rubber 2*2 | 20 | — | 20 | 40 | 20 | 20 | — | 40 |
|  | Carbon black*3 | N330 | N330 | N550 | N234 | N330 | N330 | N330 | N330 |
|  |  | 40 | 70 | 55 | 55 | 45 | 55 | 58 | 52 |
|  | Vulcanization accelerator*4 | 2 | 2 | 2 | 2 | 2 | 2 | 2 | 2 |
|  | Sulfur | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 |
|  | Zinc oxide (zinc white) | 3.5 | 3.5 | 3.5 | 3.5 | 3.5 | 3.5 | 3.5 | 3.5 |
|  | Antioxidant*5 | 3 | 3 | 3 | 3 | 3 | 3 | 3 | 3 |
| Rubber property | Fractural strength | 100 | 150 | 123 | 144 | 90 | 160 | 80 | 120 |
|  | M100 | 100 | 240 | 140 | 180 | 110 | 140 | 80 | 170 |
| Tire performance | Tire durability | 100 | 50 | 80 | 57 | 110 | 120 | 70 | 60 |

*1: BR01 manufactured by JSR corporation
*2: syndiotactic 1,2-structure-containing polybutadiene rubber (UBEPOL-VCR412, manufactured by Ube Industries, Ltd.)
*3: N234 (DBP: 125 ml/100 g, $N_2SA$: 119 $m^2/g$),
*3: N330 (DBP: 102 ml/100 g, $N_2SA$: 78 $m^2/g$)
*3: N550 (DBP: 121 ml/100 g, $N_2SA$: 40 $m^2/g$)
*4: Nocceler NS, manufactured by Ouchi Shinko Chemical Industrial Co., Ltd.
*5: N-(1,3-dimethylbutyl)-N'-phenyl-p-phenylenediamine As apparent from the results shown in Table 1 and Table 2, it has been found that the products prepared in Examples 1 to 8 falling in the scope of the present invention have high fractural strength and a high modulus and are excellent in abrasion resistance to a rim and crack resistance as compared with the products prepared in Comparative Examples 1 to 8 falling outside the scope of the present invention.

Observing the comparative examples, the rubber components and carbon blacks each falling outside the scope of the present invention were used in combination in Comparative Examples 1 to 8; in Comparative Example 1, 40 parts by mass (less than 45 parts by mass) of the butadiene base rubbers containing the syndiotactic 1,2-structure-containing polybutadiene rubber was used as a rubber component, and a content of the natural rubber was 60 parts by mass (exceeding 55 parts by mass), and a content of the carbon black having characteristics falling in the scope of the present invention was 40 parts by mass (less than 50 parts by mass); in Comparative Example 2, the syndiotactic 1,2-structure-containing polybutadiene rubber was not contained, and a content of the natural rubber was 40 parts by mass (less than 45 parts by mass); and a content of the carbon black having characteristics falling in the scope of the present invention was 70 parts by mass (exceeding 60 parts by mass); in Comparative Examples 3 and 4, carbon blacks (N550 and N234) having characteristics falling outside the scope of the present invention were used; in Comparative Example 5, a content of the carbon black having characteristics falling in the scope of the present invention was 45 parts by mass (less than 50 parts by mass); in Comparative Example 6, 40 parts by mass (less than 45 parts by mass) of the butadiene base rubbers containing the syndiotactic 1,2-structure-containing polybutadiene rubber was used as a rubber component, and a content of the natural rubber was 60 parts by mass (exceeding 55 parts by mass); in Comparative Example 7, the syndiotactic 1,2-structure-containing polybutadiene rubber was not contained; and in Comparative Example 8, a content of the butadiene base rubber containing the syndiotactic 1,2-structure-containing polybutadiene rubber was 60 parts by mass (60 parts by mass or more), and a content of the natural rubber was 40 parts by mass (less than 45 parts by mass). It has been found that the effects of the present invention (fractural strength and a modulus are high, and abrasion resistance to a rim and crack resistance are excellent) can not be exerted in the above cases.

INDUSTRIAL APPLICABILITY

The pneumatic tire for heavy load according to the present invention can suitably be used for trucks, buses, industrial vehicles, construction vehicles, aircrafts and the like, and it can suitably be used particularly as a pneumatic radial tire for aircrafts.

LIST OF REFERENCE NUMERALS AND LETTERS

1 Bead part
2 Side wall part
3 Regular rim
4 Bead core
5 Carcass
6 Bead base part
7 Bead back face part
8 Rubber chafer

The invention claimed is:
1. A pneumatic tire for heavy load in which a rubber chafer is disposed at least in a part brought into contact with a rim in a bead part, wherein the rubber chafer uses a rubber composition which comprises
(A) a rubber component consisting of
  (i) 45 to 55 parts by mass of butadiene base rubbers consisting of 15 to 45 parts by mass of high cis polybutadiene rubber and 10 to 30 parts by mass of a syndiotactic 1,2-structure-containing polybutadiene rubber and
  (ii) 45 to 55 parts by mass of a natural rubber, and
(B) more than 50 parts by mass and less than 60 parts by mass of carbon black having a dibutyl phthalate absorption (DBP) of 85 to 115 ml/100 g and a specific surface area by nitrogen adsorption ($N_2SA$) of 50 to 100 $m^2/g$ based on 100 parts by mass of the rubber component, and wherein fractural strength of the rubber chafer is 20 MPa or more in any point of a depth direction from an outer surface part to an inner surface part and a modulus M100 of the rubber chafer in 100% elongation is 2.88 to 3.8 MPa.

2. The pneumatic tire for heavy load as described in claim 1, wherein the rubber component used for the rubber chafer contains 3 to 5 parts by mass of zinc oxide based on 100 parts by mass of the rubber component.

3. The pneumatic tire for heavy load as described in claim 1, wherein the tire is a radial tire for aircrafts.

\* \* \* \* \*